United States Patent

[11] 3,617,141

| [72] | Inventor | Robert W. Sullivan<br>Rockton, Ill. |
| --- | --- | --- |
| [21] | Appl. No. | 818,646 |
| [22] | Filed | Apr. 23, 1969 |
| [45] | Patented | Nov. 2, 1971 |
| [73] | Assignee | Ekstrom Carlson & Co.<br>Rockford, Ill. |

[54] TOOL TURRET
4 Claims, 7 Drawing Figs.

[52] U.S. Cl. .................................... 408/35, 29/40
[51] Int. Cl. ........................................ B23b 39/20
[50] Field of Search ........................... 77/25, 5 LM, 6 LM; 29/53, 55, 40

[56] References Cited
UNITED STATES PATENTS

| 2,974,548 | 3/1961 | Miller ............................ | 77/22 X |
| 3,259,958 | 7/1966 | Lemelson ..................... | 77/25 UX |

Primary Examiner—Francis S. Husar
Attorney—Wolfe, Hubbard, Leydig, Voit & Osann

ABSTRACT: A toolholder including a tool turret mounted to rotate about its central vertical axis and the turret mounts a number of self-contained tool units for rotation with it. The tool units are spaced angularly around the central axis, nd each tool unit is spaced the same predetermined radial distance from the central axis. Positioned nonrotatably on the toolholder is an actuator which creates an active tool position in which a tool unit can be activated, and the solenoid is positioned so that the active tool position is created at a distance from the central axis equal to the predetermined radial distance. To be activated, a selected tool unit rotates with the turret and into the active tool position. The toolholder can be mounted in a gantry-type machine tool base over a bed on which a workpiece is supported and, with this arrangement, the active tool position can be moved relative to the workpiece from location to location. A pneumatically operated holddown located adjacent the active tool position performs the double function of holding the workpiece steady so that it can be acted on in an accurate manner by the selected tool unit and of directing jets of air at the top surface of the workpiece to clean it off prior to action by the selected tool unit.

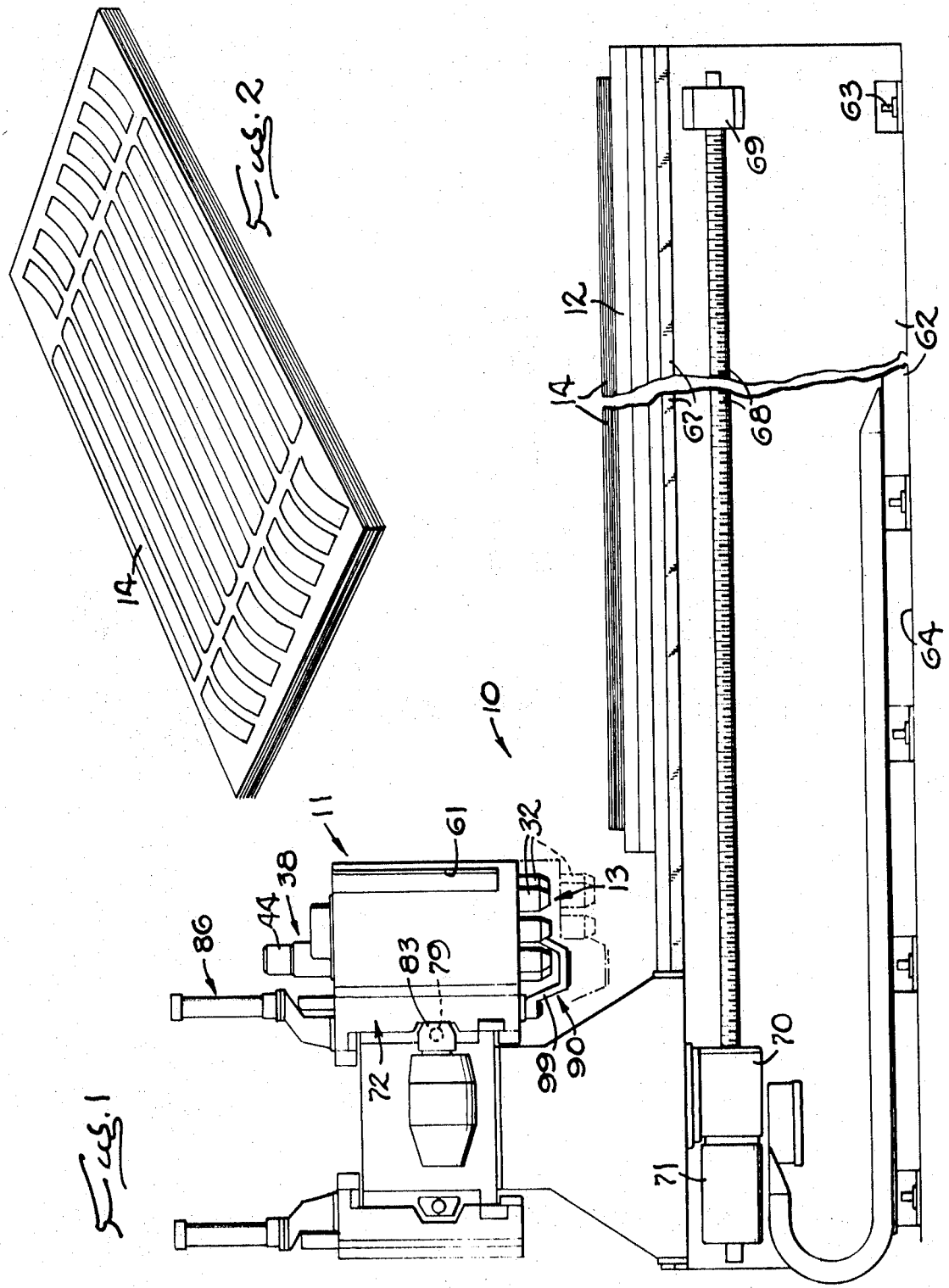

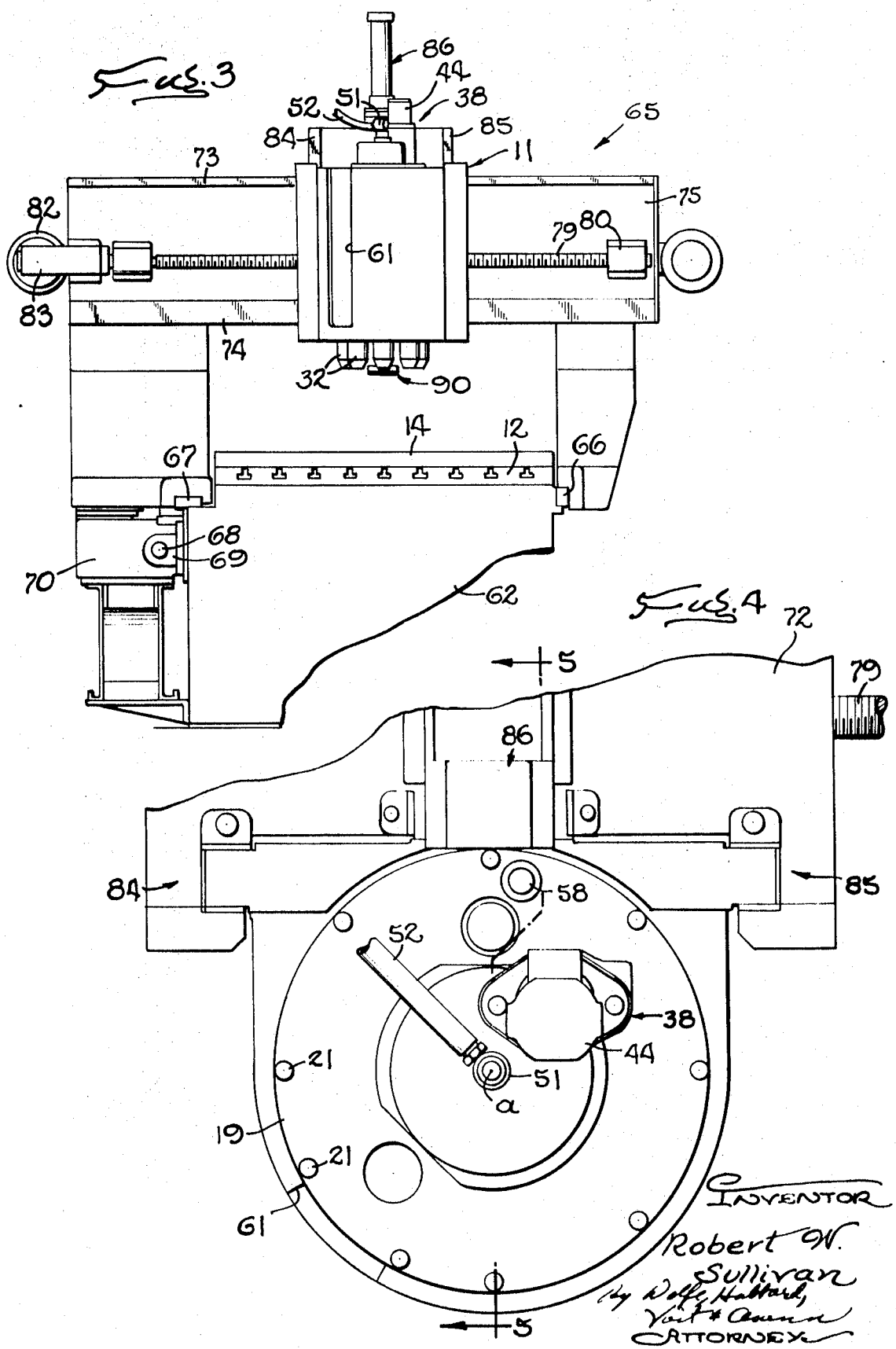

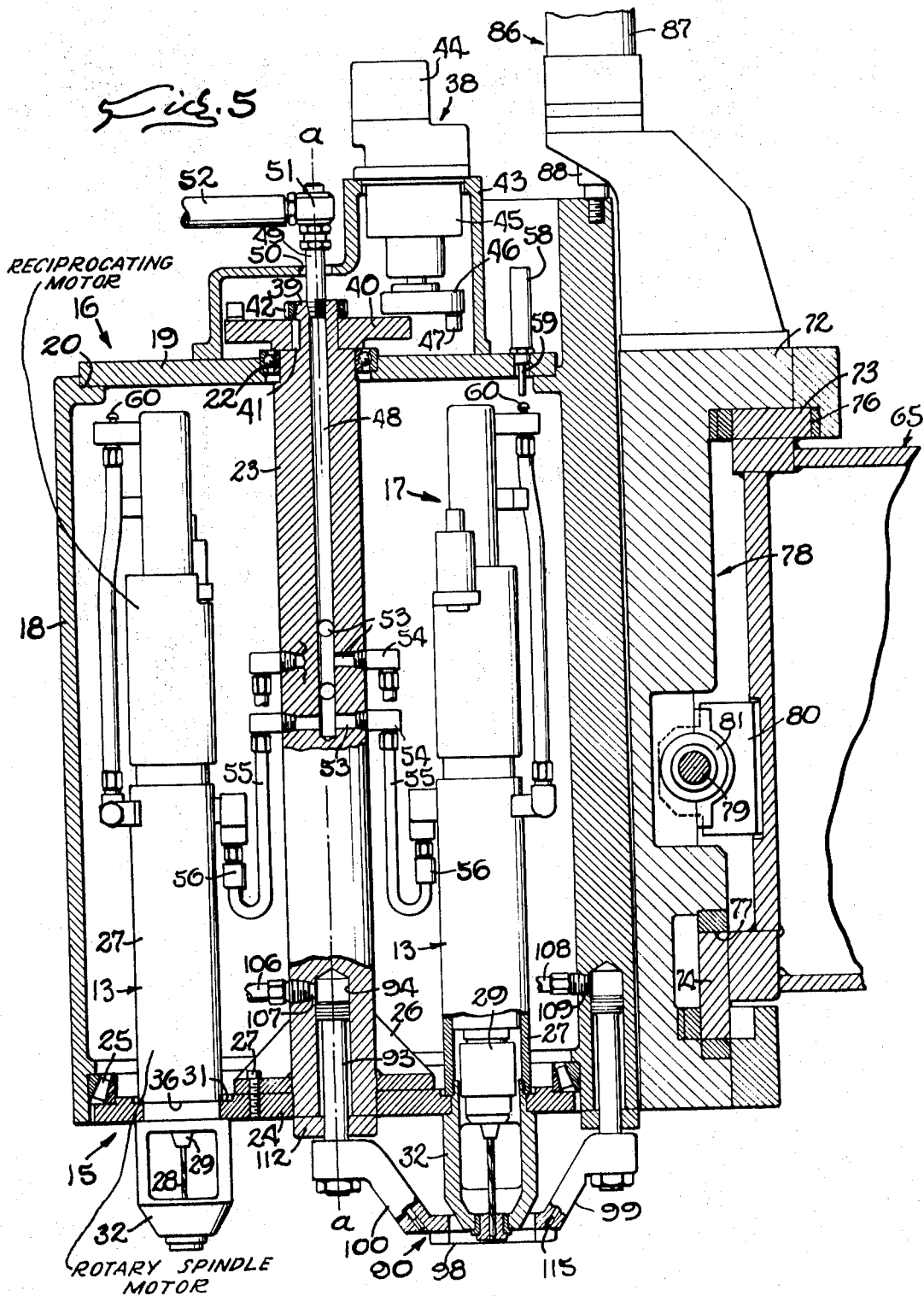

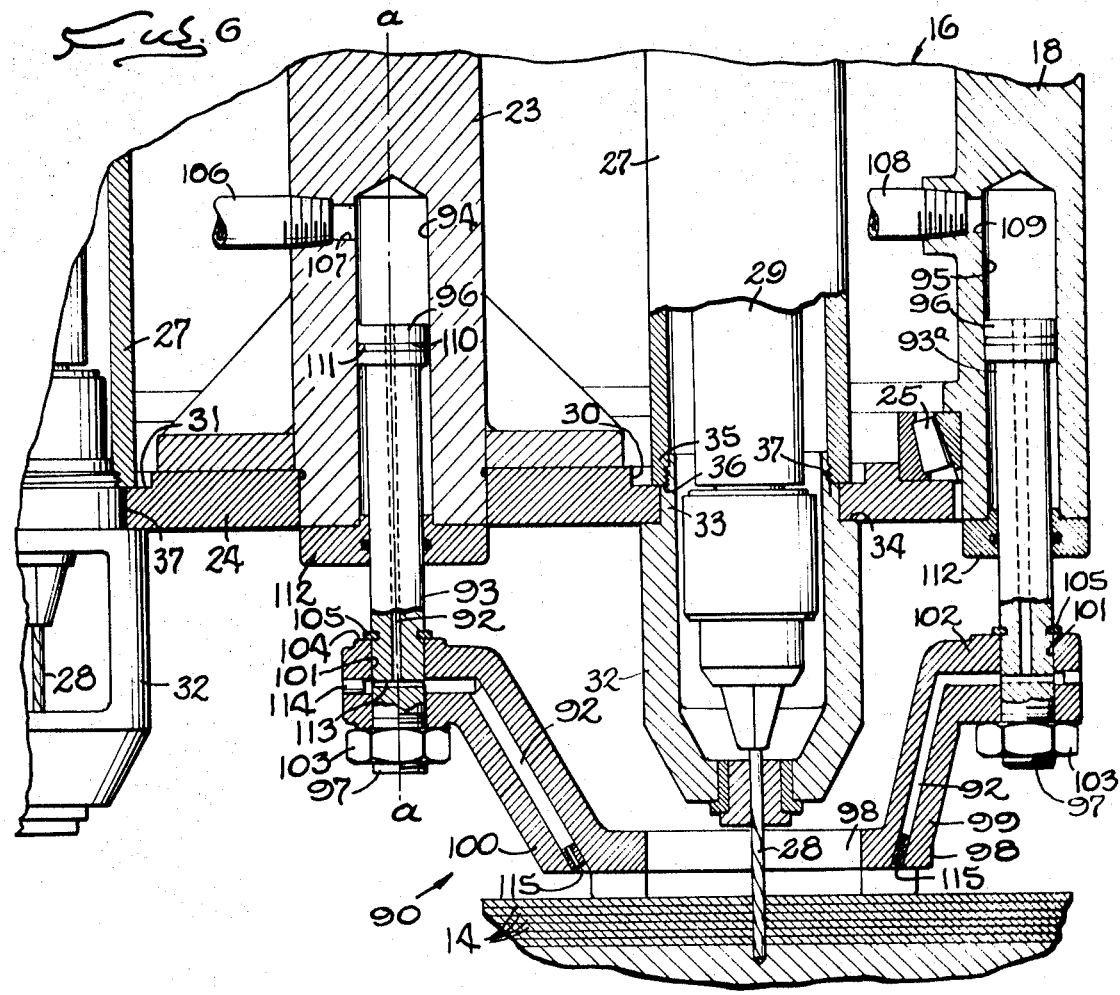
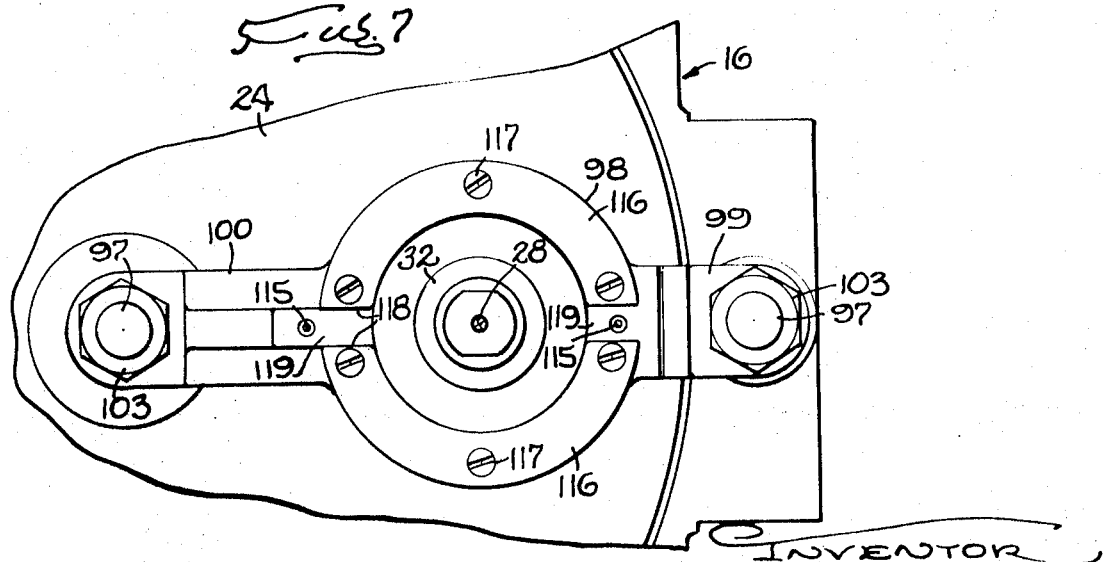

3,617,141

TOOL TURRET

BACKGROUND OF THE INVENTION

The invention relates to machine tools in which a turret mounts a number of tools for rotation so that a selected one of the tools may act on a workpiece. The invention, also relates to a gantry-type machine tool in which a workpiece remains in one position on the bed of the machine and the tool which acts on the workpiece is mounted for movement longitudinally of, laterally of, toward, and away from the stationary workpiece. During the period the tool is acting on the workpiece, the latter is held to prevent its movement.

SUMMARY OF THE INVENTION

An object of the present invention is to provide a novel toolholder for a machine tool in which a number of self-contained tool units are removably mounted on a turret portion of the toolholder and in which any selected tool unit may be rotated with the turret into an active tool position in which the tool unit can be activated to act on the workpiece.

A related object is to form the toolholder by mounting the turret in a support to rotate about a vertical central axis and, further, to create the active tool position a predetermined distance from the central axis by mounting an actuator in a fixed position on the support, and to position the tool units angularly around the central axis and radially from it the predetermined distance for rotation with the turret of each tool unit, as selected, into and out of the active tool position.

A third object is to mount the novel toolholder in a gantry-type machine tool base so that the workpiece can be placed on the bed of the machine and the active tool position can be moved longitudinally of, laterally of, toward and away from the stationary workpiece.

Another object is to provide the toolholder with a novel pneumatic holddown which straddles the active tool position to hold the workpiece steady for the selected tool unit to act in an accurate manner on the workpiece, and the holddown directs jets of air at the top surface of the workpiece to clean it of dirt, sawdust, drill chips, and the like in the immediate area to be acted on by the tool unit.

A related object is to accomplish the above by constructing the holddown as a U-shaped member which is constantly biased toward the workpiece by air pressure and by locating of passageways through the holddown to direct a portion of the pressurized air toward the workpiece for cleaning purposes.

Other objects and advantages of the invention will become apparent from the following detailed description taken in connection with the accompanying drawings.

BRIEF DESCRIPTION OF THE DRAWINGS

FIG. 1 is a side view of a machine tool embodying the novel features of the present invention FIG. 2 is a perspective of a pattern overlying a stack of workpieces to be acted on by the machine tool.

FIG. 3 is a fragmentary view of the right end of the machine of FIG. 1.

FIG. 4 is an enlarged top view of a portion of the toolholder and its connection to the carriage of the machine of FIG. 1.

FIG. 5 is an enlarged cross section taken substantially along the line 5—5 of FIG. 4.

FIG. 6 is an enlarged view of a portion of FIG. 5 showing parts in a moved position.

FIG. 7 is a bottom view of a portion of FIG. 6.

DETAILED DESCRIPTION OF THE PREFERRED EMBODIMENT

As shown in the drawings for purposes of illustration, the invention is embodied in a machine tool 10 (FIG. 1) on which a head or a toolholder 11 is suspended over the bed 12 of the machine tool. Mounted in the toolholder are a number of tool units 13 (FIGS. 1 and 5) which collectively can perform a variety of individual work operations on a workpiece or workpieces 14 (FIGS. 1 and 2) which are placed on the bed of the machine tool. As shown in FIGS. 1 and 2, a number of workpieces can be stacked up so that any given operation can be performed on all the workpieces in the stack with one operation of a given tool unit.

So that the various tool units 13 can be brought into working engagement with the workpieces 14, the toolholder comprises a turret 15 (FIG. 5) on which the tool units are mounted and a support or housing 16 which mounts the turret for rotary motion. The turret rotates about a vertical central axis $a$ (FIG. 5), and the tool units are spaced angularly about the central axis.

In accordance with the present invention, an active tool position 17 on the toolholder 11 is spaced a predetermined horizontal distance from the central axis $a$ with the tool units 13, which are self-contained units removably mounted on the turret 15 and also are spaced radially from the axis $a$ a distance equal to the predetermined distance of the active tool position, and the tool units can act on the workpieces 14 only when located in the active tool position into which any selected tool unit can be placed by rotation of the turret. With this arrangement, a selected tool unit can be rotated into the active tool position, act on the workpieces, be rotated out of the active tool position and the same sequence can then be performed with a second tool unit so that a variety of operations can be performed on the workpieces.

As shown in FIG. 5, the housing 16 comprises vertically extending sides 18 and a top 19 seated in pockets 20 formed at the tops of the sides, and the top is joined to the sides by bolts 21 (FIG. 4). Extending along the axis $a$ and journaled near its upper end by bearings 22 (FIG. 5) in the top 19 is a center post 23 which together with a cylindrical disc 24 rigidly joined to the post near its lower end form the turret 15. The disc 24 is journaled in the lower end of the sides of the housing by bearings 25, and the post extends vertically on the axial centerline of the disc so that the axial centerline of the disc coincides with the axis $a$. In this instance, the post and the disc are rigidly joined by reinforced flanges 26 which are connected to the disc by screws 27 and which are joined to the center post by welding.

Each tool unit 13 (FIG. 5) is a self-contained unit needing only a power source and a signal to operate and, in this instance, the tool units are pneumatically driven. As shown in FIG. 5, each tool unit as encased in a housing 27, and a tool 28, herein a drill bit is gripped by a spindle 29 mounted in the housing for rotation and reciprocation. Within the housing but not shown are a pneumatic rotary motor to effect the rotation of the spindle and a pneumatically operated piston and cylinder arrangement of a type well known to those skilled in the art used to effect the reciprocation of the drill bit and spindle. With this type of tool unit, the unit can be brought into position with respect to the workpieces 14 and the tool can be moved into and out of engagement with the workpieces without further bodily movement of the entire tool unit.

To mount the tool units 13 on the disc 24, a number of counterbores 30 (FIG. 6), herein eight, are spaced angularly about the central axis $a$ with the centers of the bores being spaced along a circle drawn with the axis $a$ as center. That is to say, all the counterbores are spaced equidistantly from the axis $a$. Each counterbore is drilled from the top side of the disc (FIG. 6) so that the larger diameter is at the top and, thus, a shoulder 31 is created. The smaller diameter of the counterbore is sized such that it is larger than the inside diameter of the housing 27 of a tool unit but smaller than the outside diameter of the housing so that the housing can be seated on the shoulder 31. After the housing is seated on the shoulder, an end cap 32 is inserted through the counterbore from the bottom of the disc and fastened to the housing to clamp the latter against the disc. The upper end portion 33 of the end cap is offset inwardly to form a shoulder 34 which engages the bottom of the disc when the end cap is inserted into the counterbore. In this instance, the offset end portion of the end cap is threaded and the interior of the lower end portion 35 of the housing 27 is also threaded. The threaded offset end portion 33 of the end cap is of the proper diameter to be screwed into the threaded lower end portion of the housing. When the end cap is secured in the housing, the shoulder 34 of the end cap engages the bottom of the disc 24 and the bottom 36 of the housing engages the shoulder 31 on the disc thus clamping a portion 37 of the disc between the end cap and the housing to hold the tool unit in place.

The turret 15 is rotated by a Geneva motion device 38 (FIG. 5) connected to the center post 23 at the upper end of the latter, and this rotation moves the tool units 13 from inactive tool positions into the one active tool position 17. From FIG. 1, it will be observed that there are, in the present instance, eight tool units mounted on the turret and, therefore, at any one time at least seven of them are in inactive tool positions. As shown in FIG. 5, the upper end portion 39 of the center post is offset to a smaller diameter after it extends through the top 19 of the housing 16 to receive a driven wheel 40 which is part of the Geneva motion device. The drive wheel 40 which is telescoped over the upper end portion of the center post is locked against rotation relative to the center post by a key and keyway connection 41 and against removal from the post by a nut 42 screwed on the center post over the driven wheel. Overlying the driven wheel and supported on a housing 43 which covers the driven wheel is the rest of the Geneva motion device. A motor 44 which can be operated intermittently is mounted on the housing 43, and a gear reduction unit 45 is connected to the motor and suspended from the housing. To effect the Geneva motion, a drive plate 46 with a depending stud 47 is mounted for rotation on the lower end of the gear reduction unit, and, as the drive plate rotates in response to the operation of the motor, the stud engages one of a series of slots (not shown) in the driven wheel to rotate it. With this arrangement the driven wheel is turned only while the stud engages the driven wheel which is less then one-half of a rotation of the drive plate. During the remainder of the rotation of the drive plate, the driven is stationary. With the Geneva motion device 38 it is possible to rotate the turret to move a tool unit into the active tool position, allow it to dwell there for a period of time, and then be moved out of the actual tool position. When a longer dwell period is required the motor 44 can be shut down.

To connect the tool units 13 with a stationary pneumatic source in a manner that will allow the tool units to rotate on the turret 15, an axial bore 48 (FIG. 5) is drilled in the upper half of the center post 23. At the upper end of the center post, the bore is threaded and a short length of pipe 49 is screwed into bore and extends upwardly through an opening 50 in the housing 43. The upper end of the pipe is connected by a swivel connection 51 to a tube 52 which leads to a compressor (not shown). Near the bottom of the bore, a number of ports 53 are formed horizontally through the center post walls, and a fitting 54 is screwed into each port. To connect each tool unit with a bore, a flexible tube 55 is connected at one of its ends to one of the fittings and at its other end by a quick-release coupling 56 to a fitting 57 on the tool unit.

A solenoid 58 (FIG. 5) is used to activate the tool units 13 when they are the active tool position 17. To activate a tool unit, the plunger 59 of the solenoid depresses a poppet valve 60 on the tool unit and, when the poppet valve is depressed, air is allowed into the tool unit to rotate and reciprocate the spindle 29. The active tool position is determined by the solenoid which is mounted on the top 19 of the housing 16 with the plunger 59 extending through the top so that the plunger can contact the poppet valve on the tool unit in the active tool position. In FIG. 5, it will be clearly seen that the solenoid is spaced from the axis $a$ a distance such that the poppet valve on each tool unit comes directly beneath the plunger as each tool unit is rotated with the turret 15 onto the active tool position. With the tool units rotating on the turret and the solenoid stationary on the housing, the predetermined spacing of the tool units from the axis $a$ to match the spacing of the solenoid from the axis $a$ causes the solenoid to create the active tool position 17 a distance from the axis $a$ equal to the radial spacing of the tool units from the axis $a$.

So that the tool units 13 can be quickly and easily changed, an access slot 61 (FIGS. 1 and 3) is formed in the wall 18 of the housing 16. The slot extends almost the full height of the wall and is sufficiently large to allow a workman to reach manually into the housing to remove a tool unit and replace it. Additionally, the slot gives access to the interior of the housing for cleaning purposes. To replace a tool unit 13, the tool unit is disconnected from the center post 23 by releasing the quick-release coupling 56 on the flexible tube 55. Next, the end cap 32 is removed and the tool unit is lifted from the turret 15 and removed from the housing 16 through the access slot 61. Another tool unit can be easily placed on the turret by following the above steps in reverse.

In accordance with another aspect of the invention, the novel toolholder 11 is advantageously mounted on a gantry-type support 10 (FIG. 1) for movement of the toolholder longitudinally of laterally of, toward, and away from the workpieces 14. With this arrangement, the toolholder and, consequently, the active tool position 17 can be moved over an exact location on the workpieces, and then a variety of operations can be performed on the workpiece by rotating the turret 15 and moving selected tool units 13 one at a time into the active tool position to act on the workpieces. Additionally, the active tool position can be moved from location to location with respect to the workpieces as the turret is rotated to position selected tool units one at a time in the active position so that a complete series of operations can be performed on the workpieces. In this instance, the base 62 (FIG. 1) of the gantry is formed of cast iron and is held stationary by bolts 63 which connect the base to a floor or foundation 64. To support a workpiece or stack of workpieces 14 (FIG. 2), the bed 12 is placed on the upper horizontal surface of the base.

In a gantry-type machine tool, the workpieces 14 remain stationary and the tool, in this instance the toolholder 11 with its active tool position 17, is moved from position to position so that the required operations may be performed on the workpieces. To arrange for the movement of the toolholder longitudinally of the bed 12 and the workpieces, a bridge 65 is mounted laterally over the bed. As shown in FIG. 3, a pair of longitudinally extending rails 66 and 67 are rigidly fixed to the sides of the base 62 near the upper surface of the base, and the bridge is slidably mounted on the rails. The bridge is moved along the rails by a screw and nut arrangement. Herein, this arrangement is achieved by mounting a threaded rod 68 (FIG. 1) along one side of the base and by holding the rod nonrotatably in brackets 69 (one shown in FIG. 1). Rigid with and depending from the bridge is a housing 70 (FIG. 1) in which a nut (not shown) is rotatably journaled. The nut is mounted on the rod in threaded engagement therewith, and a motor 71 is connected by gearing (not shown) to rotate nut. As the nut rotates it moves along the rod and, since it is connected through the housing 70 to the bridge, the bridge slides along the rails in response to the travel of the nut.

To move the toolholder 11 laterally across the bed, a carriage 72 (FIGS. 1, 4 and 5) is mounted on the bridge for movement laterally of the bed. As best shown in FIG. 5, a pair of rails 73 and 74 are rigidly connected to the bridge and extend in horizontal planes laterally along the face 75 (FIG. 3) of the bridge. Ways 76 and 77 (FIG. 5) in the rear face 78 of the carriage mount it for sliding movement on the rails. The carriage is also moved along the rails by a nut and screw arrangement but, in this instance, the nut is stationary and the rod rotates. A rod 79 (FIG. 3) spaced from the bridge extends horizontally across the face 75 of the bridge and is journaled for rotation in two bearings 80 which are rigidly connected to the bridge. Rigid with the rear face 78 of the carriage is a nut 81 (FIG. 5) threaded on the rod 79. To rotate the rod and force the nut to travel along the rod, thus pulling the carriage, a motor 82 (FIG. 3) mounted on the carriage is connected by gearing 83 to the left end (FIG. 3) of the rod.

The toolholder 11 is mounted on the carriage 72 for movement toward and away from the bed 12. As shown in FIG. 4, the toolholder is slidably mounted for vertical movement in ways 84 and 85 in the carriage. The toolholder is moved up and down the ways by reciprocation of a hydraulic actuator 86 (FIGS. 1 and 5). In response to the introduction of a hydraulic fluid into one end or the other of a cylinder 87, a piston (not shown) is moved up or down in the cylinder. A piston rod 88 (FIG. 5) is connected at its upper end to the piston and at its lower end to the housing 16 and, as the piston reciprocated within the cylinder, the piston rod raises and lowers the toolholder along the ways 84 and 85.

It will be observed that with this arrangement the toolholder 11 may be moved longitudinally of the bed 12 by movement of the bridge 65, the toolholder may be moved laterally of the bed by movement of carriage 72, and the toolholder may move toward and away from the bed by moving along the vertical ways 84 and 85. By moving the toolholder in this manner, the active tool position 17 may be located over any point on the bed, and the toolholder may be lowered so that a selected tool unit 13 located by rotation of the turret 15 in the active tool position can act on the workpieces 14.

So that the tool unit 13 in the active tool position 17 may act accurately on the workpieces 14, the latter must be held steady during the operation of the tool unit. Another requirement for accuracy of operation is that the workpieces be kept as free as possible of dirt, sawdust, drill chips, and the like. Thus, in accordance with still another aspect of the invention, the workpieces 14 are cleaned and then held steady by a pneumatic holddown 90 (FIG. 6) which straddles the active tool position 17 but which can be positioned to allow the turret 15 to rotate. For these purposes, a U-shaped member telescope into the bottom of the toolholder 11 is biased downwardly by pneumatic pressure and passageways 92 extending through the U-shaped member direct jets of air toward the workpieces. With this arrangement, the workpieces can be kept clean and can be held steady and the turret can still rotate to position tool units 13 in the active tool position.

To straddle the active tool position 17 and still allow the turret 15 to rotate, the legs 93 and 93a of the U-shaped holddown 90 are telescoped into the center post 23 and the housing 16, respectively. A hole 94 (FIG. 6) is drilled along the axis a in the bottom end portion of the center post and parallel to the hole 94 a hole 95 is drilled in the housing. With this arrangement, the center post can rotate about the leg 93 which is telescoped into the dead center of the center post and need not move as the centerpost rotates about it. In this instance, each leg is a rod with a cylindrical head 96 at its upper end and threads 97 and its lower end portion. Connected between the legs is a flat circular ring 98 with upstanding arms 90 and 100 which are connected to the legs. The legs extend through holes 101 in the end portions 102 of the arms, and nuts 103 are screwed onto the threaded end portions of the legs to force the top surface 104 of the end portions of the arms against snap rings 105 on the legs. With the end portions of the arms confined between the nuts and the snap rings, the circular ring must move vertically in either direction with the legs.

Air under pressure is introduced into the upper ends of the holes 94 and 95 to bias the holddown 90 toward the bed 12. To connect the holddown with a source of air pressure in a manner which will allow the center post 23 to rotate, the hole 94 is connected to the axial bore 42 (FIG. 5). Since the pressure required to operate the holddown is less than the pressure required to operate a tool unit 13, the axial bore in the upper portion of the centerpost is not extended through the centerpost. The axial bore 48 is connected to the hole 94 through a pressure reducing valve (not shown) and, to connect the bore with the hole, a pneumatic tube 106 (FIG. 5) containing the pressure reducing valve is connected to the hole 94 through a port 107 and to the axial bore 48 in the same manner as are the tool units 13. Because the support wall does not rotate, the hole 95 is connected directly to the compressor (not shown) by a pneumatic tube 108 (FIG. 5) which is connected to the upper end of the hole by a port 109 (FIGS. 5 and 6).

So that the holddown 90 will be biased toward the bed 12 by the pressure of the air injected into the holes 94 and 95, the legs 93 and 93a serve as pistons and piston rods. The heads 96 on the tops of the legs are formed with grooves 110 (FIG. 6) which seat O-rings 111 to create an air tight fit between the heads and the walls of the holes 94 and 95. Because the ports 107 and 109 are only at the upper ends of the holes, the holddown is always biased toward the bed and the workpieces 14 on the bed and the lower ends of the holes are fitted with caps 112 to prevent the heads from coming out of their respective holes. With this arrangement, when the toolholder 11 is a greater distance above the workpieces on the bed than the height of the holddown, the holddown is biased into a fully extended position. That is, the heads 96 of the legs are at the bottoms of their respective holes 94 and 95 against the caps. In this position of the holddown, the turret 15 can be rotated without the end caps 32 of the tool units 13 contacting the ring 98 of the holddown. As can be seen in FIG. 5, when the holddown is totally retracted, the end cap of the tool unit in the active tool position 17 is within the ring of the holddown and the turret cannot be rotated. Lowering of the toolholder 11 brings the extended holddown into engagement with the workpieces. Further lowering of the toolholder forces the legs 93 and 93a to move up in the holes 94 and 95 against the pressure of air being injected into the holes, and this causes the holddown to hold the workpieces firmly in place so that they might be acted accurately on by the tool unit 13 in the active tool position 17.

The holddown 90 acts as a cleanoff device by directing jets of air at the workpieces 14 as the holddown is lowered toward the workpieces. As most clearly shown in FIG. 6, the center of each leg 93 and 93a is drilled from the top of the leg to the midpoint of each leg's connection to its respective arm 99 and 100 to form passageways 92. The arms are also drilled to continue the passageways and a horizontal hole 113 is drilled in each leg to connect the passageways in the legs with those in the arms. A plug 114 is inserted at the upper ends of the passageways in the arms to close off those ends of the passageway. With the passageway extending through the top of the legs, the pressurized air in the holes 94 and 95 which biases the holddown can partially escape through the passageways, and this air is formed into jets and used to blow clean the workpieces. The lower ends of the passageways in the arms are each plugged with a small orifice nozzle 115. These form the escaping air into small jets which blows the dirt, dust, drill chips, and the like off the workpieces 14.

To prevent the passageways 92 from becoming closed by being pressed against the workpieces 14, the bottom of the flat ring 98 is built up. A pair of half-ring-shaped bumper plates 116 (FIG. 7) are fastened to the bottom of the flat ring by screws 117. The ends 118 of the half-rings are spaced apart to form air channels 119 so that the jets of air are continually directed toward the area on the workpiece to be acted on by the tool 28 of the tool unit 13. Because the orifices in nozzles at the lower ends of the passageways 92 are much smaller in diameter than the ports 107 and 109, pressure is maintained on the holddown even though a portion of the air escapes.

It will be observed that the above described toolholder 11 with the easily replaceable tool units 13 mounted on the turret 15 for movement into a single active tool position 17 is uniquely able to perform a series of operations which requires a variety of tools. Further, by mounting this novel toolholder on a gantry-type machine 10, the active tool position on the toolholder can be moved over an exact location on the workpieces 14 so that a variety of operations can be performed at that one location or the active tool position can be moved from location to location to utilize the same tool unit over and over or moved to use a variety of tool units. It will also be observed that the provision of the pneumatic holddown 90 on the bottom of the toolholder equips the toolholder not only with a resiliently mounted device for holding the workpieces in place for accurate operation of the tool units but also with an effective means for cleaning off workpieces which utilizes the power source of the holddown.

I claim:

1. A toolholder for a machine tool having, in combination, a housing, a turret having a vertical axis and being mounted in said housing to rotate about the vertical axis, means connected to said turret for selectively rotating the turret, a number of tool units removably mounted on said turret so that any unit may be quickly and easily replaced, each of said tool units including a tool and means for rotating and reciprocating the tool, an actuator on said housing determining an active tool position a predetermined horizontal distance from the vertical axis, each tool unit also including an element coacting with said actuator when in the predetermined position and operable to activate said means for rotating and reciprocating whereby said turret may be rotated to place a preselected one of said tool units in said active tool position to position the tool unit over a workpiece and then said means may be activated to rotate and reciprocate the tool into and out of working engagement with the workpiece without movement of the housing during such rotation and reciprocation.

2. A toolholder for a machine tool having in combination, a housing, a turret mounted in said housing to rotate about a vertical axis, said turret including a vertical post centered thereon and extending along said axis, said post having an axial bore adapted to be connected to an air compressor, means connected to said turret for selectively turning the turret, a number of pneumatically operated tool units connected to said bore to receive pneumatic power and removably mounted on said turret so that any unit may be quickly and easily replaced, each of said tool units including a tool, means for rotating and reciprocating the tool and mounted thereon to actuate the means for rotating and reciprocation, and a solenoid on said housing determining an active tool position a predetermined horizontal distance from the vertical axis, said solenoid being adapted to be selectively operated to depress the poppet valve of each tool when it is in the active tool position to actuate said means for rotating and reciprocating whereby said turret may be turned to place a preselected one of said tool units in said active tool position to position the tool unit over a workpiece and then said means may be activated to rotate and reciprocate the tool into and out of working engagement with the workpiece without movement of the housing during such rotation and reciprocation.

3. The toolholder of claim 2 in which means for holding the workpieces in place to be acted on by the tool unit in the active tool position and for cleaning the workpieces is mounted on said toolholder.

4. The toolholder of claim 2 further including a U-shaped member mounted in the bottom of said toolholder and straddling said active tool position, said U-shaped member comprising two vertically extending legs with one leg slidably mounted in said centerpost and one leg slidably mounted in said housing, a ring-shaped bottom member connected between said legs, means for exerting pneumatic pressure on the tops of said legs so that said U-shaped member is biased away from said toolholder to act as a holddown, and passageways in said legs extending from the tops of said legs to said ring shaped member whereby a portion of the pneumatic pressure is released through said passageways to blow the workpieces clean.

* * * * *